UNITED STATES PATENT OFFICE.

HENRY STAIER, OF NEW YORK, N. Y.

MATCH-HEAD OR SIMILAR COMPOSITION.

1,144,077.   Specification of Letters Patent.   Patented June 22, 1915.

No Drawing.   Application filed March 17, 1915. Serial No. 15,072.

*To all whom it may concern:*

Be it known that I, HENRY STAIER, a citizen of the United States, and resident of New York, in the county of New York and State of New York, have invented certain new and useful Improvements in Match-Head or Similar Compositions, of which the following is a specification.

My invention relates to compositions for matches, fuses, and the like.

The object of my invention is to make match head compositions which are substantially damp-proof. This I accomplish by substituting gum ammoniac for part of the glue or other binder, customarily used for the manufacture of match heads. A suitable proportion of gum ammoniac is 30% by weight of the glue which would normally be used, omitting of course a corresponding percentage of glue; i. e. the binder would be used in the proportion ordinarily used for such compositions, but would consist of gum ammoniac 30% and glue 70%. The gum ammoniac may be dissolved or emulsified in water before mixing with the glue.

My composition may be manufactured for example in the following manner: In 50 pounds of water are mixed 6 pounds of gum ammoniac, 14 pounds of glue or other agglutinating material, the solution or emulsion being promoted by heat if necessary. To this binder there is added 40 pounds of potassium chlorate or sodium chlorate, 20 pounds of oxid of zinc, 18 pounds of phosphorus sesquisulfid or amorphous phosphorus and 20 pounds of powdered glass or other filler. This mixture is used for making match heads in the customary manner. It will be understood that the proportions may be varied and that I may use with my new binder other materials suitable for the purpose specified. The matches thus produced I find to be substantially damp-proof.

I claim:

1. A composition of matter for making match heads or other similar purposes, comprising combustible and flaming materials, an oxygen carrying material and a binder containing gum ammoniac, substantially as described.

2. A composition of matter for making match heads and for similar purposes, comprising potassium chlorate, sulfid of phosphorus and a binder comprising an aqueous paste of 30% of gum ammoniac and 70% of glue.

Signed at New York in the county of New York and State of New York this 16th day of March A. D. 1915.

HENRY STAIER.

Witnesses:
  S. B. SONNENFELD,
  ARTHUR WORISCHEK.